US008702083B2

(12) United States Patent
Doi et al.

(10) Patent No.: US 8,702,083 B2
(45) **Date of Patent: *Apr. 22, 2014**

(54) RARE EARTH MAGNET HOLDING JIG AND CUTTING MACHINE

(75) Inventors: Yuhito Doi, Echizen (JP); Takehisa Minowa, Echizen (JP); Takayuki Hasegawa, Echizen (JP); Takaharu Yamaguchi, Echizen (JP); Koji Sato, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 607 days.

This patent is subject to a terminal disclaimer.

(21) Appl. No.: 12/984,717

(22) Filed: Jan. 5, 2011

(65) Prior Publication Data

US 2011/0162504 A1 Jul. 7, 2011

(30) Foreign Application Priority Data

Jan. 6, 2010 (JP) ................................. 2010-001054

(51) Int. Cl.

| | |
|---|---|
| ***B25B 11/00*** | (2006.01) |
| ***B23Q 3/00*** | (2006.01) |
| ***G11B 5/127*** | (2006.01) |
| ***B24B 1/00*** | (2006.01) |
| *B26D 1/12* | (2006.01) |

(52) U.S. Cl.
USPC ............ 269/289 R; 269/8; 29/603.15; 451/28

(58) Field of Classification Search
USPC ............ 269/289 R, 8, 296; 451/28, 488, 365, 451/57, 41; 29/603.15
See application file for complete search history.

(56) References Cited

U.S. PATENT DOCUMENTS

| | | | | |
|---|---|---|---|---|
| 1,301,135 | A | 4/1919 | Karasick | |
| 1,312,546 | A | 8/1919 | Karasick | |
| 2,511,962 | A * | 6/1950 | Barnes | 451/41 |
| 2,905,064 | A * | 9/1959 | Nielsen | 269/7 |
| 3,336,551 | A | 8/1967 | Stead | |
| 3,439,416 | A | 4/1969 | Yando | |
| 3,885,498 | A | 5/1975 | Jenkins | |
| 4,079,927 | A * | 3/1978 | Rocton | 269/296 |
| 4,125,046 | A * | 11/1978 | Kroh et al. | 83/437.2 |
| 4,383,357 | A | 5/1983 | Chapman et al. | |
| 4,542,890 | A | 9/1985 | Braillon | |

(Continued)

FOREIGN PATENT DOCUMENTS

| | | | |
|---|---|---|---|
| JP | 6-304833 | A | 11/1994 |
| JP | 2000-280160 | A | 10/2000 |

(Continued)

*Primary Examiner* — Alin Grant
(74) *Attorney, Agent, or Firm* — Westerman, Hattori, Daniels & Adrian, LLP

(57) ABSTRACT

A magnet holding jig comprises a platform and first and second holders disposed on opposite sides of the platform. The platform is provided with channels, the holders are comb-shaped to define digits and slits, the channels and the slits being aligned to define guide paths for permitting entry of a cutting tool therein, and the holders are also configured as digitate hooks. The holder hooks are in contact with a rare earth magnet block resting on the platform. The holders are pushed inward at their lower portions so as to elastically deform the digitate hook and move it backward and to bring the hook digits in pressure abutment with the magnet block, thereby holding the magnet block in place on the platform.

11 Claims, 13 Drawing Sheets

(56) References Cited

U.S. PATENT DOCUMENTS

| | | | | | |
|---|---|---|---|---|---|
| D281,328 | S | * | 11/1985 | Irelan et al. | D15/133 |
| 5,066,936 | A | | 11/1991 | Hsu | |
| 5,270,678 | A | | 12/1993 | Gambut et al. | |
| 5,532,892 | A | | 7/1996 | Nix et al. | |
| 6,095,025 | A | * | 8/2000 | Mirabello | 83/177 |
| 6,353,318 | B1 | | 3/2002 | Sin et al. | |
| 6,463,920 | B1 | * | 10/2002 | Kondo et al. | 125/15 |
| 6,739,586 | B2 | | 5/2004 | Hu et al. | |
| 6,889,586 | B2 | | 5/2005 | Kondo et al. | |
| 7,506,429 | B2 | | 3/2009 | Zolla et al. | |
| 7,784,171 | B2 | | 8/2010 | Kagami et al. | |
| 7,837,185 | B2 | * | 11/2010 | Naito et al. | 269/289 R |
| 2010/0112904 | A1 | * | 5/2010 | Sato et al. | 451/28 |
| 2010/0275522 | A1 | * | 11/2010 | Kasashima et al. | 51/295 |
| 2011/0162504 | A1 | * | 7/2011 | Doi et al. | 83/676 |
| 2011/0165822 | A1 | * | 7/2011 | Doi et al. | 451/28 |
| 2011/0312255 | A1 | * | 12/2011 | Akada et al. | 451/57 |
| 2012/0282847 | A1 | * | 11/2012 | Sato et al. | 451/365 |
| 2012/0282848 | A1 | * | 11/2012 | Sato et al. | 451/488 |
| 2012/0326371 | A1 | * | 12/2012 | Doi et al. | 269/8 |

FOREIGN PATENT DOCUMENTS

| | | | |
|---|---|---|---|
| JP | 2001-212730 | A | 8/2001 |
| JP | 2006-068998 | A | 3/2006 |
| JP | 2007-044806 | A | 2/2007 |

* cited by examiner 6
6a
61
63

6
6a
6b
62
61
61a
C
B
D 6
6a
62
61
61a
63

6
63
62
6b
6a

RARE EARTH MAGNET HOLDING JIG AND CUTTING MACHINE

CROSS-REFERENCE TO RELATED APPLICATION

This non-provisional application claims priority under 35 U.S.C. §119(a) on Patent Application No. 2010-001054 filed in Japan on Jan. 6, 2010, the entire contents of which are hereby incorporated by reference.

TECHNICAL FIELD

This invention generally relates to a multiple blade cutting machine for multiple cutoff machining of a rare earth magnet block. More particularly, it relates to a jig for fixedly holding the magnet block during machining by the multiple blade cutting machine.

BACKGROUND ART

Systems for manufacturing commercial products of rare earth magnet include a single part system wherein a part of substantially the same shape as the product is produced at the stage of press molding, and a multiple part system wherein once a large block is molded, it is divided into a plurality of parts by machining. These systems are schematically illustrated in FIG. 1. FIG. 1A illustrates the single part system including press molding, sintering or heat treating, and finishing steps. A molded part P101, a sintered or heat treated part P102, and a finished part (or product) P103 are substantially identical in shape and size. Insofar as normal sintering is performed, a sintered part of near net shape is obtained, and the load of the finishing step is relatively low. However, when it is desired to manufacture parts of small size or parts having a reduced thickness in magnetization direction, the sequence of press molding and sintering is difficult to form sintered parts of normal shape, leading to a lowering of manufacturing yield, and at worst, such parts cannot be formed.

In contrast, the multiple part system illustrated in FIG. 1B eliminates the above-mentioned problems and allows press molding and sintering or heat treating steps to be performed with high productivity and versatility. It now becomes the mainstream of rare earth magnet manufacture. In the multiple part system, a molded block P101 and a sintered or heat treated block P102 are substantially identical in shape and size, but the subsequent finishing step requires cutting. It is the key for manufacture of finished parts P103 how to cutoff machine the block in the most efficient and least wasteful manner.

Well-known methods for cutoff machining of rare earth magnet blocks include a wire cutting method using a wire having abrasive grains bonded to the surface thereof, an outer- and inner-diameter cutting methods using outer- and inner-diameter blades.

Tools for cutting rare earth magnet blocks include two types, a diamond grinding wheel inner-diameter (ID) blade having diamond grits bonded to an inner periphery of a thin doughnut-shaped disk, and a diamond grinding wheel outer-diameter (OD) blade having diamond grits bonded to an outer periphery of a thin disk as a core. Nowadays the cutoff machining technology using OD blades becomes the mainstream, especially from the aspect of productivity. The machining technology using ID blades is low in productivity because of a single blade cutting mode. In the case of OD blade, multiple cutting is possible. FIG. 2 illustrates an exemplary multiple blade assembly 5 comprising a plurality of cutoff abrasive blades 51 coaxially mounted on a rotating shaft 52 alternately with spacers (not shown), each blade 51 comprising a core 51*b* in the form of a thin doughnut disk and an abrasive grain layer 51*a* on an outer peripheral rim of the core 51*b*. This multiple blade assembly 5 is capable of multiple cutoff machining, that is, to machine a block into a multiplicity of parts at a time.

When a rare earth magnet block is machined by a multiple blade assembly, the magnet block is generally secured to a carbon-based support by bonding with wax or a similar adhesive which can be removed after cutting. The bonding with wax is achieved by heating the carbon-based support and the magnet block, applying molten wax between the support and the magnet block, and cooling for solidification. In this state, the magnet block is cut into pieces. The cutting operation is followed by heating to melt the wax, allowing the magnet pieces to be removed from the support. Since wax is kept attached to the magnet pieces at this point, the wax must be removed using a solvent or the like.

The adhesive way of securing a magnet block with wax involves concomitant steps of heat bonding, heat stripping and cleaning in addition to the cutting step, rendering the process very cumbersome. As a result, the cost of the cutting process is increased. One solution to this problem is a means for holding a magnet block without a need for wax, specifically a holding jig which is comb-shaped so as to allow passage of cutting blades during cutting.

For example, JP-A H06-304833 and JP-A 2001-212730 disclose a mechanism comprising a jig segment pivotally mounted for holding a workpiece on a support. Since the shape and size of a workpiece which can be held by the jig are limited, a jig must be separately prepared for a particular shape of workpiece. In some cases, an elastic member is disposed between the jig and the workpiece. Under the stress induced during the holding, the elastic member can be deformed in a complex way. It is then impossible to hold the magnet block at the same posture before and after the cutting operation. If magnet pieces are inclined immediately after cutting, they may contact with the cutting blades. As a result, the magnet pieces may be abraded and degraded in dimensional accuracy, and the cutting blades be damaged.

JP-A 2007-044806 proposes an apparatus for clamping a magnet block by resin-based jigs. The magnet block is disposed between U-shape recessed jigs, and the magnet block is held in place by deformation of the jigs. Since the force applied to the magnet block by cutting blades during the cutting operation acts to push downward the lower fingers of the U-shape recessed jigs, the U-shape is outward expanded, failing to keep the clamped state until the end.

In the jigs disclosed in JP-A 2007-044806 and JP-A 2000-280160, the cutting direction is set vertical. The cutting distance is limited to the distance of downward movement of a cutting blade assembly. This inhibits an efficient arrangement wherein a plurality of workpieces are arranged in tandem in the cutting direction.

JP-A 2006-068998 discloses a jig comprising a resinous support and a resinous frame for holding a magnet block on the support. It is difficult to uniformly distribute the holding force of the frame over the entire magnet block and to hold discrete magnet pieces after cutting. As the thickness of cut magnet pieces decreases, the resinous frame becomes thinner, failing to maintain strength. Since the magnet block is loaded to and unloaded from the jig by screw engagement, the loading/unloading operation is cumbersome.

Most of the foregoing patent documents relate to a mechanism for clamping a workpiece by a comb-shaped jig. As discussed for the respective documents, they have problems such as the limited shape of a magnet block and cumbersome loading/unloading operation. In fact, these mechanisms are difficult to hold a workpiece or magnet block in place until the completion of cutting. It is likely that immediately after cutting, magnet pieces move sideways and come in contact with the rotating cutting blades which are being retracted at the end of cutting. Then the magnet pieces may be abraded, resulting in dimensional degradation, and the interference between magnet pieces and cutting blades can cause magnet piece fissure and/or cutting blade damage.

CITATION LIST

Patent Document 1: JP-A H06-304833
Patent Document 2: JP-A 2001-212730
Patent Document 3: JP-A 2007-044806
Patent Document 4: JP-A 2000-280160
Patent Document 5: JP-A 2006-068998

DISCLOSURE OF INVENTION

An object of the invention is to provide a jig for holding a rare earth magnet block in place when the block is cut into pieces by multiple cutting blades, which is effective for preventing the magnet pieces from moving sideways during and immediately after cutting, thus maintaining the magnet pieces at an improved dimensional accuracy after cutting; and a rare earth magnet block cutting machine comprising the jig.

The inventors have found that a magnet holding jig as defined below prevents a workpiece from moving sideways during cutting and ensures to hold the workpiece in place. The jig may be advantageously used in cutting of a rare earth magnet block by multiple outer-diameter cutoff abrasive blades. When the multiple cutoff abrasive blades are rotated with the peripheral cutting parts of the cutoff abrasive blades inserted into the guide paths, the jig prevents the workpiece from moving sideways. This ensures cutting operation at a high accuracy and high speed.

In one aspect, the invention provides a jig for holding a rare earth magnet block in place when the block is cut in a transverse direction by a cutting machine having multiple cutting blades, comprising a platform on which the magnet block is rested, the platform having opposed sides in the transverse direction, a first holder disposed on one side of the platform and constructed integral with or separate from the platform, and a second holder disposed on the other side of the platform and constructed separate from the platform. At least a top portion of the platform is provided with channels, at least upper portions of the first and second holders are comb-shaped to define digits and slits, the channels and the slits are aligned to together define guide paths for permitting entry of the cutting blades therein, the upper portions of the first and second holders are also configured as digitate hooks each having an inward projecting tip, the platform, first and second holders are assembled such that the hook tips of the first and second holders are in contact with an upper portion of the magnet block resting on the platform. The jig further comprises pusher means for pushing inward the first and second holders at their lower portions so as to elastically deform the digitate hook of at least one of the first and second holders and move it backward and to bring the hook digits in pressure abutment with the magnet block, whereby the restoring force due to the stress of elastic deformation causes the hook digits to forcedly press the magnet block for thereby holding the magnet block in place on the platform.

In a preferred embodiment, one or both of the first and second holders are formed of a material having a Young's modulus of $5\times10^3$ MPa to $1\times10^5$ MPa. More preferably, one or both of the first and second holders are formed of a material having a Young's modulus of $5\times10^3$ MPa to $1\times10^5$ MPa and a yield strength (or proof stress) of at least $2\times10^2$ MPa.

In a preferred embodiment, at least one of the first and second holders has stop means for restricting the backward movement of the hook when the hook is elastically deformed and moved backward, so that the stress of elastic deformation may not exceed the yield strength of the material of which the holders are formed. Specifically, the stop means comprises a stop disposed in the holder below the hook, the stop is spaced apart from the magnet block when the hook tip is in contact with the magnet block prior to the elastic deformation of the hook, but comes in abutment with the magnet block when the hook is elastically deformed and moved backward by a predetermined amount, for thereby restricting further backward movement of the hook. Preferably, the stop is configured to a shape and/or size which is less susceptible to elastic deformation than the hook.

Preferably the hook of one of the first and second holders is configured to a shape and/or size that allows for more backward movement by elastic deformation than the hook of the other holder.

In another aspect, the invention provides a multiple jig arrangement comprising a plurality of jigs as defined above, arranged in tandem in the transverse direction, wherein the backsides of the hooks of two adjacent jigs come in abutment with each other when the hook is elastically deformed and moved backward by a predetermined amount, for thereby restricting the backward movement of the hook so that the stress of elastic deformation may not exceed the yield strength of the material of which the holders are formed. Preferably a plurality of jigs are arranged in tandem such that the first holders and the second holders are alternately arranged.

In a further aspect, the invention provides a machine for cutting a rare earth magnet block comprising the jig defined above. Typically, the cutting machine further comprises a multiple blade assembly comprising a plurality of cutoff abrasive blades coaxially mounted on a rotating shaft at axially spaced apart positions, each said blade comprising a core in the form of a thin disk or thin doughnut disk and a peripheral cutting part on an outer peripheral rim of the core.

Advantageous Effects of Invention

When a rare earth magnet block is cut by multiple cutoff abrasive blades, the magnet block can be held in place by the jig without a need for wax bonding. The jig which is simple as compared with prior art jigs prevents the workpiece from moving sideways during the cutting operation and ensures cutting operation at a high accuracy and high speed. The jig is of great worth in the industry.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DESCRIPTION OF EMBODIMENTS

In the following description, the singular forms "a," "an" and "the" include plural referents unless the context clearly dictates otherwise. As used herein, terms such as "upper", "lower", "outward", "inward", and the like are words of convenience, and are not to be construed as limiting terms. For example, the term "inward" refers to a direction toward a longitudinal axis of a magnet block, whereas the term "outward" refers to a direction away from the axis of the magnet block and is interchangeable with "backward". The term "axial" is used with respect to the center of a circular blade (or the axis of a shaft) and a direction parallel thereto, and the term "radial" is used with respect to the center of a circular blade.

Jig

The magnet holding jig of the invention is used to hold a rare earth magnet block, typically a sintered rare earth magnet block, in place when the magnet block is cutoff machined into pieces of desired size by a cutting machine such as wire saw or OD cutoff abrasive wheel blade machine. The magnet block is cut in a transverse direction.

The jig comprises a platform, a first holder, and a second holder. The platform is a base plate on which the magnet block is rested. The first and second holders are disposed on opposite sides of the platform as viewed in the transverse direction of the magnet block. The first holder is disposed on one side of the platform and constructed integral with or separate from the platform. The second holder is disposed on the other side of the platform and constructed separate from the platform. The first and second holders clamp the magnet block from the opposite sides in the transverse direction to hold the magnet block in place on the platform.

Figure 3A:
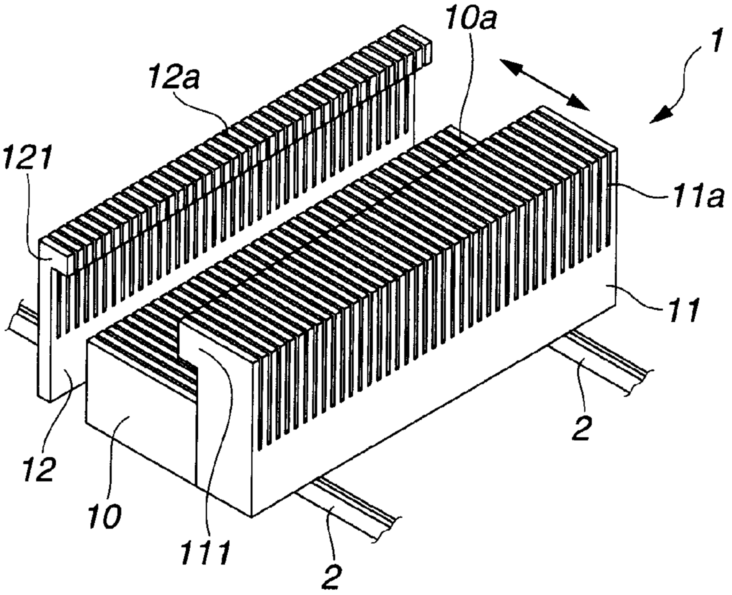
FIG. 3 illustrates an exemplary magnet holding jig in one embodiment of the invention, FIG. 3A being a perspective view with first and second holders on standby, FIG. 3B being a perspective view with first and second holders in contact with a magnet block, and FIG. 3C being a side elevational view of FIG. 3B.
Figure 3B:
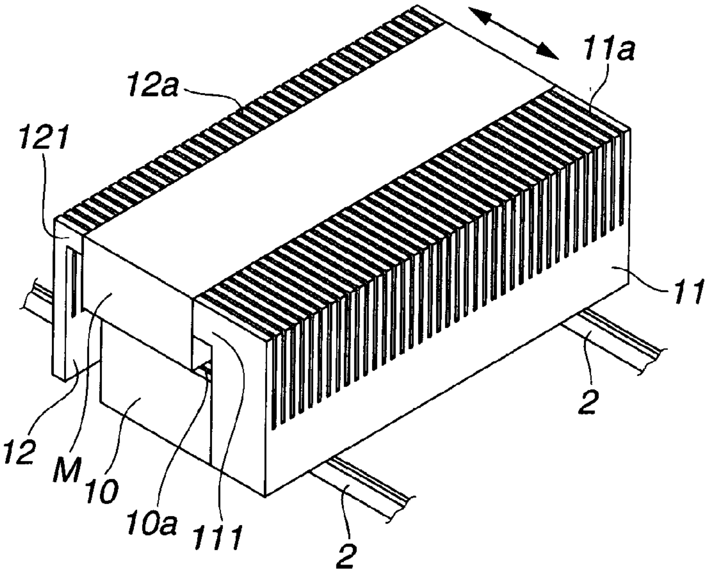
Figure 3C:
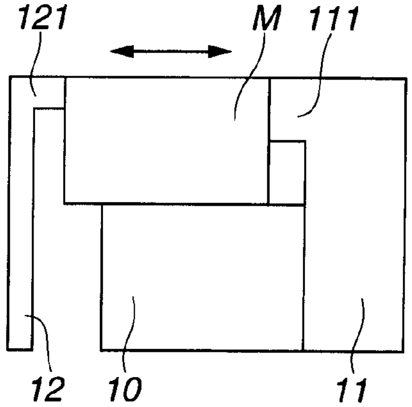
Figure 4:
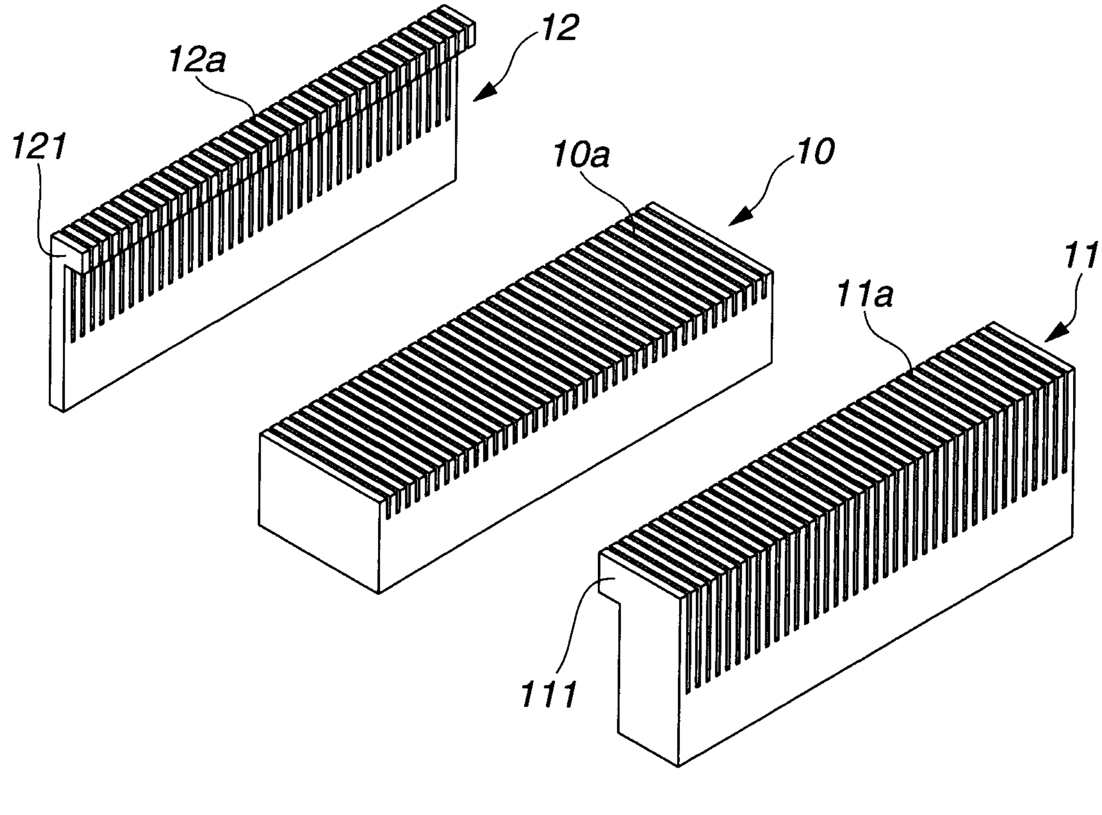
FIG. 4 is a perspective view showing a platform, first and second holders being disassembled.

Referring to FIGS. 3 and 4, an exemplary magnet holding jig in one embodiment of the invention is illustrated. A jig 1 is illustrated as comprising a platform 10 on which a rare earth magnet block M of rectangular parallelepiped shape to be cut in a transverse direction indicated by the arrow in FIG. 3 is rested. First and second holders 11 and 12 are disposed on opposite sides of the platform 10 in the transverse direction. The platform 10, first and second holders 11 and 12 are mounted on a linear guide mechanism 2 such that they are allowed to move only in the transverse direction when the magnet block M is loaded or unloaded and held in place and that the first and second holders 11 and 12 may not fall forward or backward.

At least upper portions of the first and second holders are comb-shaped to define digits and slits. The upper portions of the first and second holders are also configured as digitate hooks each having an inward projecting tip (facing the magnet block). The first and second holders are constructed such that the tips of hooks may come in contact with an upper portion (upper side surface or top surface) of the magnet block on the platform.

Specifically, in the jig of FIGS. 3 and 4, the upper portions of the first and second holders 11 and 12 are configured as digitate hooks 111, 121 of inverted L-shape in cross section. Notably, the first and second holders 11 and 12 each as a whole are configured as a hook of inverted L-shape in cross section. Each hook 111, 121 has an inward projecting tip (facing the magnet block) which may come in contact with the box-shaped magnet block M (at a side wall upper portion thereof).

At least a top portion of the platform is provided with channels while at least upper portions of the first and second holders are comb-shaped to define digits and slits as mentioned above. The channels in the platform are aligned with the slits in the first and second holders to together define guide paths for permitting entry of the cutting blades therein when the magnet block is cut.

Specifically, in the jig of FIGS. 3 and 4, a top portion of the platform 10 is provided with a predetermined number of channels 10*a* in the transverse direction of the magnet block M. The number of channels is determined in accordance with the size of magnet pieces cut from the magnet block. For example, 39 channels are formed in the embodiment of FIGS. 3 and 4, but the number of channels is not limited thereto. The first and second holders 11 and 12 including a hook-shaped upper portion and an intermediate portion are comb-shaped to form a predetermined number of digits (111, 121) and slits 11*a*, 12*a* defined therebetween. The slits 11*a*, 12*a* are aligned with the channels 10*a* to define guide paths. For example, 39 slits are formed in the embodiment of FIGS. 3 and 4, but the number of slits is not limited thereto.

When a magnet block is held in place by the jig comprising the platform and the first and second holders, the magnet block is first rested on the platform. The first and second holders are set so that the hooks at their tip may contact with the upper portion of the magnet block. In the embodiment wherein the first holder is constructed integral with the platform, the magnet block is rested on the platform so that the hook of the first holder at its tip may contact with the one side of the magnet block, after which the second holder is moved so that the second holder hook at its tip may contact with the opposite side of the magnet block.

The jig further comprises pusher means for pushing inward the first and second holders at their lower portions, thus pressing the first and second holders against the magnet block. Then the hooks of the first and second holders are elastically deformed and moved backward or warped outward. The digitate hooks abut against the magnet block. The elastic deformation creates a stress, and the restoring force due to the stress causes the digitate hooks to abut against the magnet block for thereby holding the magnet block in place on the platform.

Figure 5A:
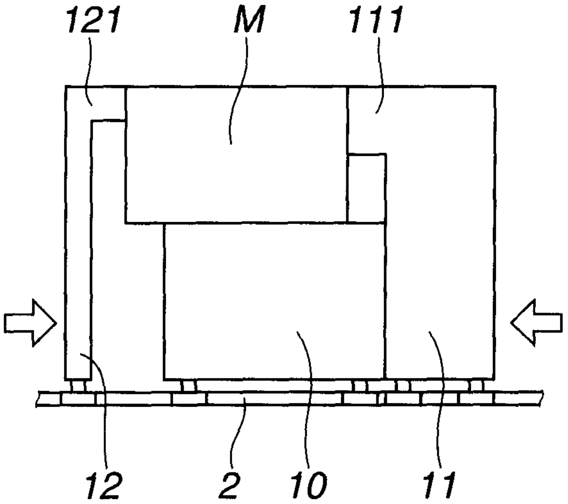
FIG. 5 illustrates how to hold the magnet block by the jig, FIG. 5A being a side elevational view of first and second holders in contact with a magnet block, and FIG. 5B being a side elevational view of first and second holders being in pressure abutment with the magnet block to hold the block in place.
Figure 5B:
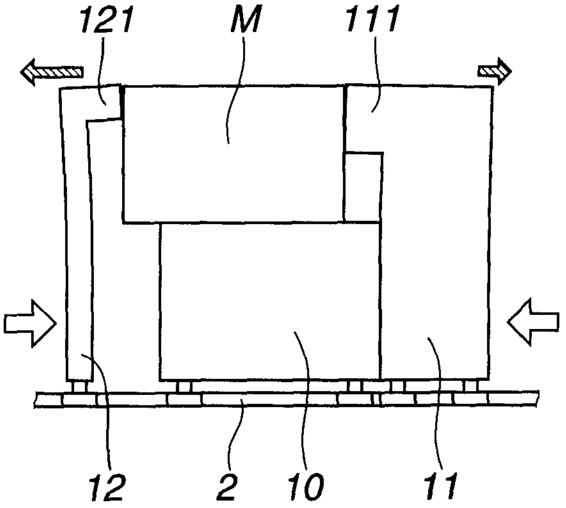

Specifically, the jig of FIGS. 3 and 4 is set such that the hooks 111, 121 of the first and second holders 11, 12 at their tip are in contact with the magnet block M resting on the platform 10. As shown in FIG. 5A, pusher means (shown by thick arrows) are provided for pushing inward the first and second holders 11 and 12 at their lower portions from the outside in the transverse direction. Then, as shown in FIG. 5B, the hooks 111, 121 of the first and second holders 11 and 12 are elastically deformed. The hooks 111, 121 of the first and second holders 11 and 12 are moved backward (or warped outward) relative to the lower portion of the first and second holders 11 and 12. The digitate hooks 111, 121 are in pressure abutment with the magnet block M. The elastic deformation creates a stress, and the restoring force due to the stress causes the digitate hooks 111, 121 (specifically, total 80 hook digits on the first and second holders in the setup of FIGS. 3 and 4) to press inward the magnet block M for thereby holding the magnet block M in place on the platform 10. Before the pusher means start pushing inward the first and second holders 11 and 12 (before the hooks come in pressure abutment with the magnet block), the first and second holders 11 and 12 at their hook tip are in contact with the magnet block, and the second holder 12 is spaced apart from the platform 10.

It is acceptable for the jig that before the actuation of the pusher means, only some of the hook digits (111, 121) (some of 80 hook digits in the embodiment of FIGS. 3 and 4) on the first and second holders 11 and 12 be in contact with the magnet block. When the first and second holders 11 and 12 are pushed inward to move the hooks 111, 121 backward, all the hook digits (111, 121) are brought in pressure abutment with the magnet block M to hold the block M in place.

The pusher means may be a pneumatic cylinder or cam clamp, but is not limited thereto. It may also be a plunger utilizing pneumatic or hydraulic pressure or a mechanism utilizing screw engagement for maintaining a pressing force.

As described above, the jig is designed such that the magnet block is held in place by the pressing force resulting from backward movement of the hook formed on an upper portion of the holder. Before the first and second holders are pushed inward to bring the hooks in pressure abutment with the magnet block, the first and second holders except the hook tips are kept out of contact with the magnet block. Also before the first and second holders are pushed inward, the second holder is spaced apart from the platform in the embodiment wherein the first holder is constructed integral with the platform, or one or both of the first and second holders are spaced apart from the platform in the embodiment wherein the first holder is constructed separate from the platform. The spacing between the platform and the holder is such that when the holder is pushed toward the platform, the hook in an upper portion of the holder may be moved backward by a predetermined amount necessary to hold the magnet block in place.

The pusher means pushes inward the holder at such a position that the hook in an upper portion of the holder may be moved backward or outward. Specifically, a lower portion of the holder, more specifically a portion of the holder excluding the hook must be pushed from the outside. A provision must be made such that the holder itself may not turn over even when a lower portion of the holder is pushed inward. To this end, for example, the holder is configured such that the holder may come in pressure abutment with the platform (i.e., the spacing between the holder and the platform may become nil) when the hook in an upper portion of the holder is moved backward by a predetermined amount necessary to hold the magnet block in place. Also, if necessary, a spacer of a predetermined length may be disposed between the holder and the platform.

Alternatively, the first and second holders are restricted so that they may be movable only in the cutting transverse direction of the magnet block. For example, as shown in FIGS. 3 and 4, the first and second holders 11 and 12 are mounted on the linear slide mechanism 2 so that they may be movable only in the cutting transverse direction of the magnet block. The slide mounting prevents the first and second holders 11 and 12 from turning over when the first and second holders 11 and 12 are pushed at their lower portions, even though the first and second holders 11 and 12 are spaced apart from the platform 10. The slide mounting also enables the jig to be applied to magnet blocks of different size and facilitates loading and unloading of the magnet block. If a magnet block has a large size in the transverse direction, the platform is replaced by a broader one, or two or more platforms are combined so that the size of the platform may correspond to the size of the block.

In a preferred embodiment, one or both of the first and second holders are formed of a material having a Young's modulus of $5\times10^3$ MPa to $1\times10^5$ MPa. When the magnet block is held in place by clamping it between the hooks of the holders, the respective hooks are elastically deformed and moved backward (or warped outward) as shown in FIG. 5B. If the elastic deformation of the hook is too large, the warp or inclination of the hook becomes large, and the pressing force from the hook to the magnet block in the transverse direction becomes short, allowing the magnet block to be unfastened from the jig during the cutting operation.

Inversely, if the holders are formed of a rigid material allowing substantially no elastic deformation, there is a risk that the jig cannot accommodate magnet blocks of different size and fails to provide necessary holding. As discussed above, the hook of the holder is elastically deformed and moved backward, taking an outward warped posture. It is then believed that the contact between the magnet block and the holder is line or point contact at the lower edge of the tip surface of the hook rather than surface contact. With fine irregularities on the magnet block surface and the holder surface taken into account, the range of actual contact is further limited.

The magnet block or workpiece may have a dimensional variation of the order of at least several microns between different positions on the magnet block even thought it has been dimensionally finished. If the hook of the holder is formed of a material capable of adequate elastic deformation, digits of the digitate hook may come in pressure abutment with the magnet block to hold it in place while accommodating a dimensional variation of the magnet block. Even when a magnet block has dimensional variations, the jig performs well in that the pusher means pushes the holders to elastically deform the hook digits and move them backward (or warp them outward), for bringing the respective hook digits in compliant abutment with the magnet block, depending on dimensional variations of the magnet block. Due to the restoring force resulting from the stress of elastic deformation of the respective digits of the digitate hook, all the hook digits may come in pressure abutment with the magnet block.

Inversely, if the hooks of the holders are formed of a rigid material allowing substantially no elastic deformation, only some digits of the digitate hook come in contact with the magnet block, or only some digits of the digitate hook come in pressure abutment with the magnet block, while the remaining digits do not fully abut against the magnet block. Even in this state, some digits of the digitate hook hold the whole magnet block in place until the magnet block is cut into pieces. However, immediately before and after the magnet block is separated into magnet pieces by cutting, despite the need to hold discrete magnet pieces, those magnet pieces corresponding to the remaining digits not in contact with the magnet block are not in pressure abutment or not fully pressed. Then those magnet pieces may be moved aside or removed from the jig, for example, under the pressure of cutting fluid injected to the magnet block during the cutting operation. Any shifting of magnet pieces may cause a lowering of dimensional accuracy. If magnet pieces removed from the jig after cutting contact with the cutting blades, the magnet pieces and/or the cutting blades can be damaged.

The material of which the first and second holders are formed should preferably have a fully high yield strength or proof stress in order that the hooks of the holders tightly clamp the magnet block to hold it in place and the distance of backward movement of the hook by elastic deformation be sufficient. In particular, with the above-described dimensional variation between different positions on the magnet block taken into account, when the holders are pushed to bring all digits of the digitate hooks in pressure abutment with the magnet block, even those digits undergoing the greatest deformation should be kept within the elastic deformation region. A low yield strength or proof stress is undesired for the reason that once the hooks are largely deformed, they are kept deformed, due to a transition from the elastic deformation region to the plastic deformation region. Then, a restoring force necessary to hold the magnet block in place is not available. Therefore, one or both of the first and second holders are preferably formed of a material having a yield strength or proof stress of at least $2\times10^2$ MPa. From the standpoint of repeated use of the jig, one or both of the first and second holders are preferably formed of a material having a fatigue strength of at least $8\times10^1$ MPa.

Although the material of which the holders are formed is not particularly limited, high strength engineering plastics and metal or alloy materials such as iron, stainless steel, aluminum and brass are preferred.

From the standpoint of the dimensional variation between different positions on the magnet block, when a magnet block which has been dimensionally finished is cut, the holders are preferably formed such that elastic deformation may be maintained over a range of deformation amount before and after backward movement (or outward warp) of the hook which is from 0.01 mm to 1 mm, preferably from 0.01 mm to 0.1 mm, calculated as the total of the first and second holders. Specifically, the deformation amount may be represented by a distance of movement in the transverse direction of the hook in abutment with the magnet block.

When a magnet block immediately after sintering and prior to dimensional finishing is cut, which has a larger dimensional variation, the holders are preferably formed such that elastic deformation may be maintained over a range of deformation amount before and after backward movement (or outward warp) of the hook which is from 0.1 mm to 2 mm, preferably from 0.5 mm to 1.5 mm, calculated as the total of the first and second holders. In order to maintain elastic deformation in the specified range, physical properties of the material of the holders, especially hooks are selected, and the height or width (in the direction of outward warp of the hook) of the holders, especially hooks is determined as appropriate.

Notably, the setting of deformation amount and the design of hook shape may also be performed by a general linear static analysis. An appropriate deformation amount is an amount corresponding to a dimensional variation of a magnet block. The deformation amount may be slightly larger than the amount corresponding to a dimensional variation of a magnet block, insofar as it does not exceed the yield strength or proof stress of the hook-forming material. An extra deformation beyond that level is unnecessary because excess deformation produces a stress which exceeds the yield strength or proof stress, leading to breakage of the hooks.

One of the hooks of the first and second holders is preferably configured to a shape and/or size to undergo more backward warp by elastic deformation than the other. When one holder is more susceptible to elastic deformation, the one holder provides a sufficient elastic deformation amount to accommodate a dimensional variation of a magnet block or workpiece, and the other holder providing a less elastic deformation amount functions as the support point for holding. This enables to hold the magnet block in place consistently at any stage before and after cutting of the magnet block.

The jig is provided with guide paths for receiving cutting blades. When outer-diameter cutoff abrasive wheel blades are used, for example, the guide paths are arranged in alignment with the outer peripheral parts of the cutoff abrasive blades. The cutoff abrasive blades are inserted into the guide paths in a straight and parallel relationship. Accordingly, the width of the guide path is configured to a width corresponding to the width of the abrasive portion of the cutoff abrasive blade.

During cutting of a magnet block, a cutting fluid is fed. The cutting fluid is contacted with the outer peripheral portions of the cutoff abrasive blades, entrained on the surfaces (outer peripheral portions) of the cutoff abrasive blades, introduced into the guide paths in the jig, transported onto the magnet block, and delivered to points of cutoff machining. Then the guide path has a width which must be greater than the width of the cutoff abrasive blade (i.e., the width W of the outer cutting part). If guide paths have too large a width, the cutting fluid may not be effectively fed to the cutoff abrasive blades. Provided that the peripheral cutting part of the cutoff abrasive blade has a width W (mm), the width of the guide path (i.e., spacing between hook digits) in the jig is preferably more than W mm, and more preferably from (W+0.1) mm to (W+6) mm.

The length of the guide path in the transverse direction is preferably in the range of 1 mm to 100 mm, and more preferably 3 mm to 100 mm, as measured from the magnet block which is held in place by the jig. If the guide path has a length of less than 1 mm, the guide path is less effective in preventing scattering of the cutting fluid or accommodating the cutting fluid when the cutting fluid is delivered to the workpiece or magnet block. If the guide path has a length of more than 100 mm, the effect of delivering the cutting fluid to the machining area is no longer enhanced, and the overall machining apparatus becomes large sized without merits. The depth of each guide path is selected appropriate depending on the height of the magnet block. Since the magnet block must be cut throughout, the guide paths are preferably formed in the jig components slightly deeper than the lower surface of the magnet block held by the jig, specifically to a depth of at least 1 mm, more specifically at least 5 mm.

The width of each hook digit (dimension perpendicular to the transverse direction of a magnet block) is less than or equal to the width of each magnet piece cut from the magnet block. A difference between the hook digit width and the magnet piece width is preferably up to 1 mm, more preferably up to 0.5 mm. The difference is preferably as small as possible because a smaller difference is effective for inhibiting the cutoff abrasive blades from axial runout. With respect to the height of each hook digit (i.e., the height of the holder), since more effective holding is possible by clamping the magnet block at a higher position between the hooks, the hook digit may have a top high enough, but not contacting the rotating shaft of the cutoff blade assembly during the cutting operation. A magnet block is preferably cut by cutoff abrasive blades having a possible cut distance (distance from the rotating shaft to the outer periphery) which is set somewhat longer than the height of the magnet block because this setting is more effective for inhibiting the cutoff abrasive blades from axial runout during the cutting operation. Therefore, the height of the top of the hook digits (or the holder) is equal to the height of the magnet block or within a range of ±10 mm relative to the height of the magnet block.

The guide paths in the jig components may be pre-formed. Alternatively, they may be formed in the first cycle of cutoff machining by cutoff machining a magnet block or dummy workpiece which is properly held until grooves are formed in the holders and platform, which process is known as co-machining.

In the jig, at least one of the first and second holders is preferably provided with a stop means for restricting the backward movement (or outward warp) of the hook when the hook is elastically deformed and moved backward, so that the stress of elastic deformation may not exceed the yield strength or proof stress of the material of which the holder is formed. The stop means should be configured to a shape and/or size which is less susceptible to elastic deformation than the hook.

Figure 6A:
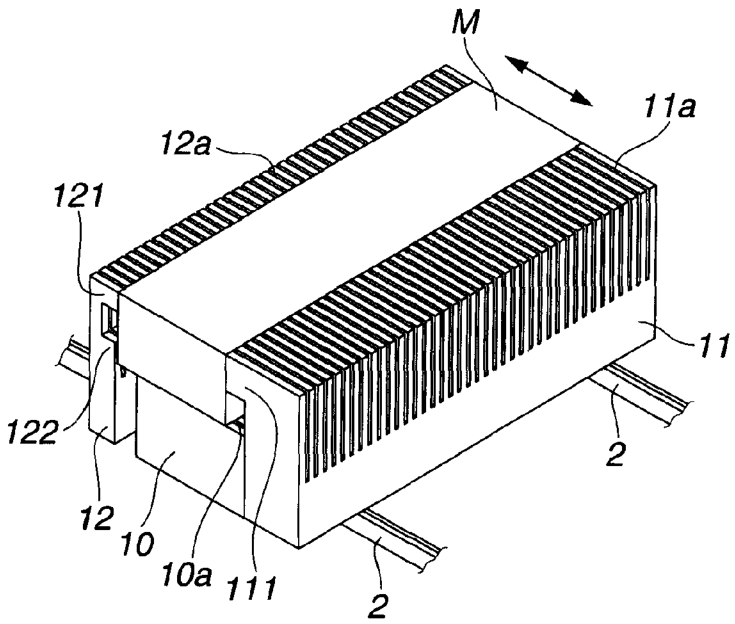
FIG. 6 illustrates an exemplary magnet holding jig in another embodiment of the invention, FIG. 6A being a perspective view with first and second holders in contact with a magnet block, FIG. 6B being a side elevational view of FIG. 6A, and FIG. 6C being a side elevational view of first and second holders being in pressure abutment with the magnet block to hold the block in place.

The stop means may be formed in one or both of the first and second holders below the hook. Specifically, as shown in FIG. 6A, for example, the second holder 12 is provided with the hook 121 at a position higher than the bottom surface of a magnet block M, the hook 121 of generally inverted L-shape cross section including an upper portion or head 121*a* and a lower portion or post 121*b*. The second holder 12 is also provided with a stop 122 at a position below the hook 121, so that the stop 122 is spaced apart from the magnet block M when the tip of the hook 121 is in contact with the magnet block M (before the holders are pushed and before the hooks are elastically deformed). Herein, the second holder 12 as a whole is generally U-shaped in elevational cross section. The width of the stop 122 in the transverse direction is slightly shorter than the width of the head 121*a* of the hook 121 which is in contact with the magnet block M, and the width of the post 121*b* of the hook is further shorter.

Figure 6B:
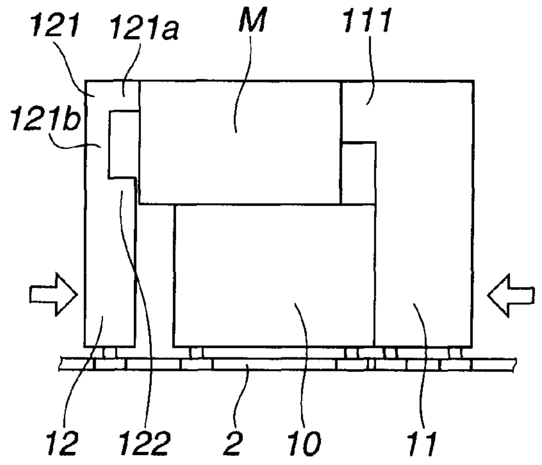
Figure 6C:
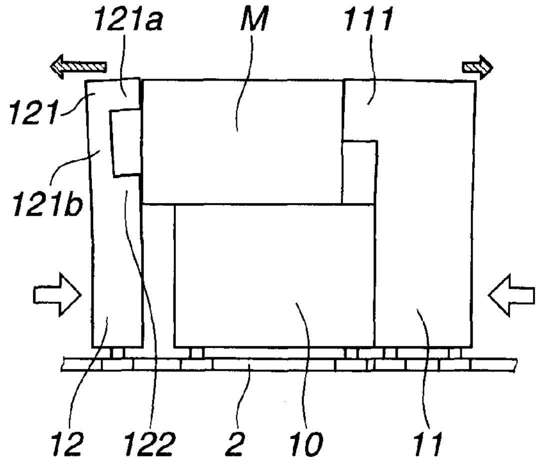

FIG. 6 shows the jig wherein the hooks 111, 121 of the first and second holders 11 and 12 at their tip are in contact with the magnet block M resting on the platform 10. In this state, as shown in FIG. 6B, the first and second holders 11 and 12 at their lower portion are pushed inward to press the magnet block M from the outsides in the transverse direction. Then, as shown in FIG. 6C, the hooks 111, 121 of the first and second holders 11 and 12 are elastically deformed, the hooks 111, 121 are moved backward or warped outward relative to the lower portions of the first and second holders 11 and 12, and the restoring force due to the stress of the elastic deformation presses inward the hooks 111, 121 to abut their tips against the magnet block M for thereby holding the magnet block M in place on the platform 10. If the hook 121 is moved backward (or warped outward) by a predetermined amount through elastic deformation, then the stop 122 comes in contact with the magnet block M as shown in FIG. 6C. Since the width of the stop 122 is greater than the width of the post 121*b* of the hook 121, the stop 122 is configured less susceptible to elastic deformation than the post 121*b* of the hook 121. Then the stop 122 undergoes substantially no elastic deformation. When the stop 122 comes in contact with the magnet block M, the stop 122 inhibits the hook 121 from further backward movement.

Provision of a stop for limiting further backward movement of the hook inhibits the deformation of the hook from transiting from the elastic deformation region to the plastic deformation region. The stop is thus effective for preventing breakage of the holder and application of any excessive pressing force to the magnet block.

In a further preferred embodiment, a plurality of jigs each comprising a platform, a first holder, and a second holder as defined above are arranged in tandem in the transverse direction of a magnet block to construct a multiple jig arrangement. In the embodiment, when the hooks are elastically deformed and moved backward by a predetermined amount, the backsides of the hooks of two adjacent jigs come in abutment with each other for thereby restricting the backward movement of the hooks so that the stress of elastic deformation may not exceed the yield strength or proof stress of the material of which the hooks (or the holders) are formed.

Figure 7A:
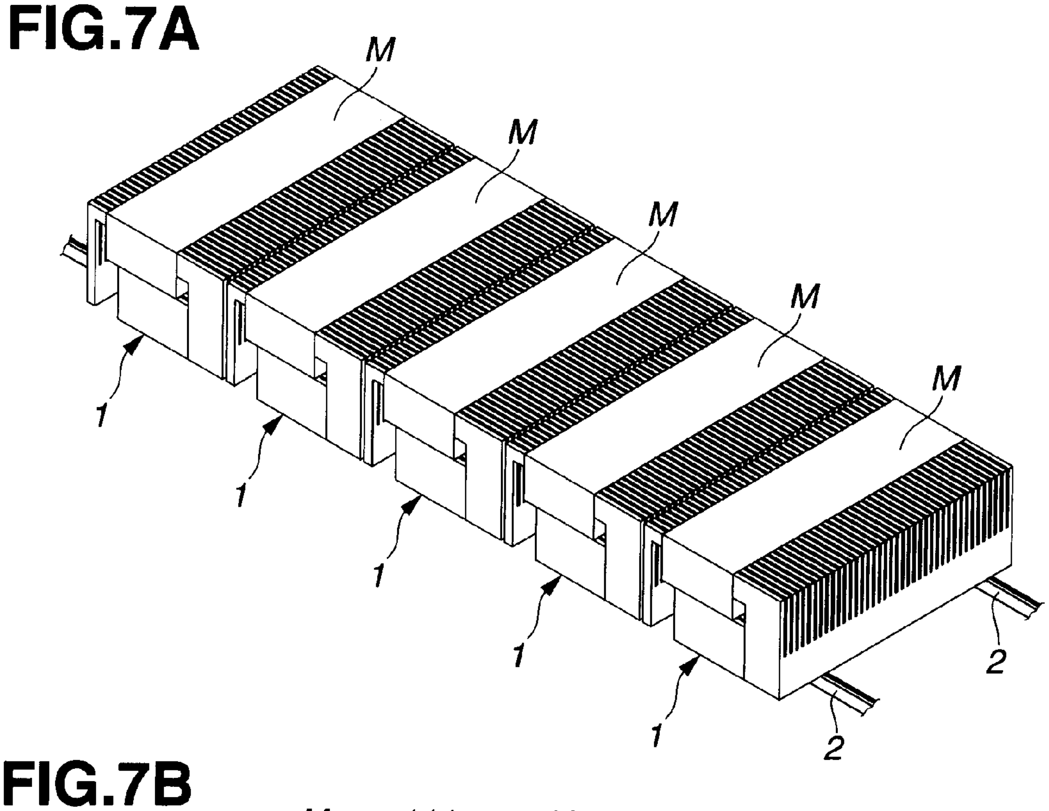
FIG. 7 illustrates an exemplary multiple jig arrangement comprising a plurality of jigs arranged in tandem in a transverse cutting direction of a magnet block, FIG. 7A being a perspective view with first and second holders in contact with a magnet block, FIG. 7B being a partial side elevational view of FIG. 7A, and FIG. 7C being a partial side elevational view of first and second holders being in pressure abutment with the magnet block to hold the block in place.
Figure 7B:
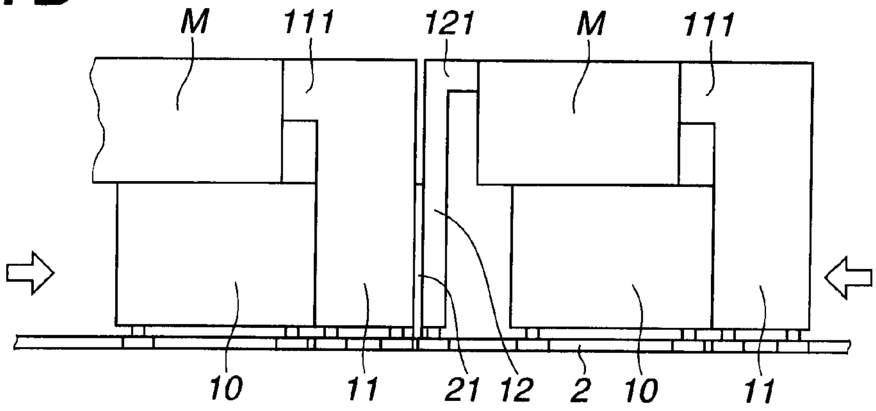
Figure 7C:
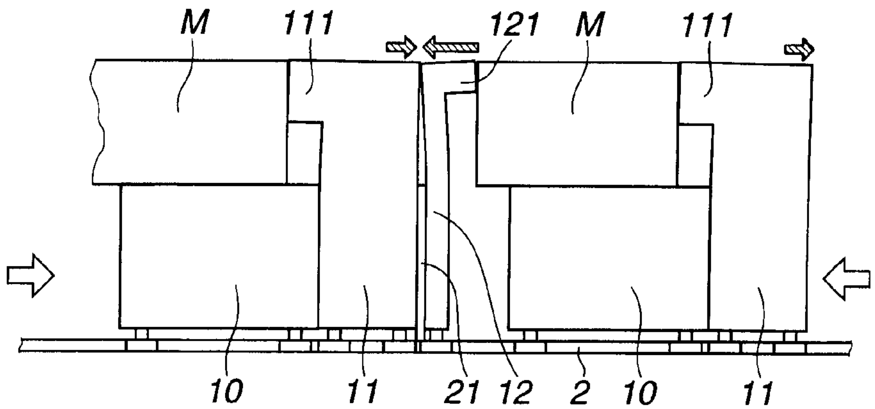

Such a multiple jig arrangement is illustrated in FIG. 7A as comprising a plurality of jigs 1 (five jigs in FIG. 7A, but not limited) arranged in tandem in the transverse direction of magnet blocks M. As shown in FIG. 7B, the first and second holders 11 and 12 located at the opposite ends of the multiple jig arrangement are pushed inward at their lower portions from the opposite outsides of the multiple jig arrangement. Then as shown in FIG. 7C, the hooks 111, 121 of the first and second holders 11 and 12 located at the opposite ends of the multiple jig arrangement are elastically deformed. The hooks 111, 121 are moved backward (or warped outward) relative to the lower portions of the first and second holders 11 and 12. The restoring force due to the stress of the elastic deformation causes the tips of the hooks 111, 121 to forcedly abut against the magnet block M inward for thereby holding the magnet block M in place on the platform 10.

In the multiple jig arrangement illustrated in FIG. 7, a spacer 21 of predetermined thickness is disposed between two adjacent jigs 1 and contiguous to the lower portions of the holders. The spacer 21 is used to provide a predetermined spacing between two adjacent jigs and a provision is made so as to prevent the holders from turning over upon pushing. Then those hooks 111 and 121 other than those of the jigs at the opposite ends of the multiple arrangement are also elastically deformed and moved backward by a predetermined amount. When the hooks 111 and 121 are moved backward, as shown in FIG. 7C, the back surfaces of the adjoining hooks 111 and 121 of two adjacent jigs are abutted against each other. The mutual abutment limits further backward movement of the hooks 111 and 121. The thickness of the spacer 21 is adjusted so that the stress of elastic deformation may not exceed the yield strength or proof stress of the material of which the hooks (or the holders) are formed. In this embodiment, since the adjoining (back-to-back) hooks of two adjacent jigs act as a stop against each other, a transition of deformation of the hooks from the elastic deformation region to the plastic deformation region does not occur. This prevents breakage of the holders and also inhibits application of any excessive pressing force to the magnet block.

In such a multiple jig arrangement, jigs may be arranged such that first holders adjoin each other or second holders adjoin each other. However, an arrangement wherein first and second holders are alternately arranged is preferred because a plurality of magnet blocks can be held by an equal force and the stops can exert an equivalent function.

Where the function of a stop is applied, advantageously one of the first holder hook and the second holder hook is configured to a shape and/or size capable of more backward movement (or outward warping) by elastic deformation than the other holder hook. If one holder is more susceptible to elastic deformation than the other, the distance of permissible backward movement of the hook until the backward movement of the hook is limited by the stop may be set in a broader range. In the case of a multiple jig arrangement, the other holder less susceptible to elastic deformation can function as a stop for the one holder. This is advantageous in that after a magnet block is cut into magnet pieces, the holding state of adjacent magnet pieces cut in the transverse direction has no substantial impact.

Figure 8A:
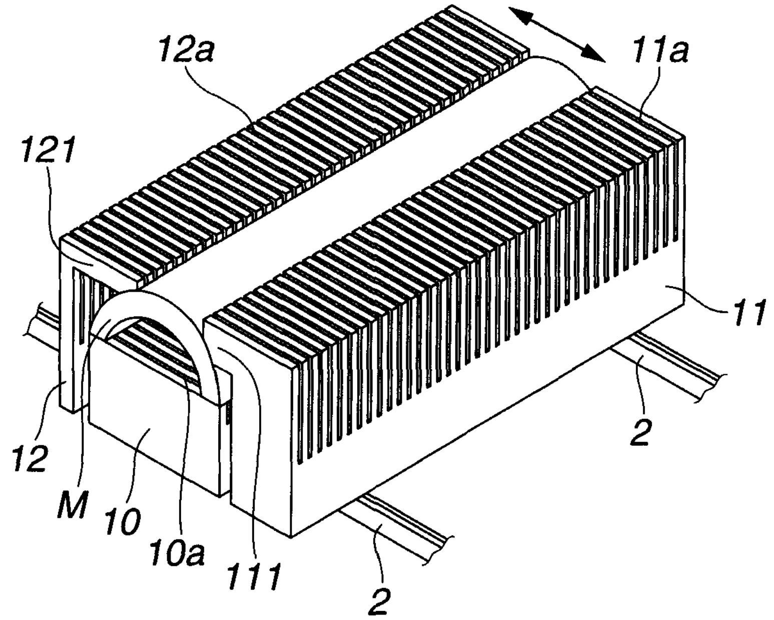
FIG. 8 illustrates an exemplary magnet holding jig in a further embodiment of the invention, FIG. 8A being a perspective view with first and second holders in contact with a magnet block, and FIG. 8B being a side elevational view of FIG. 8A.
Figure 8B:
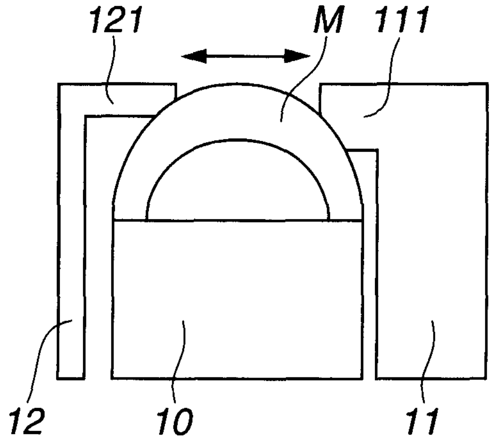
Figure 9A:
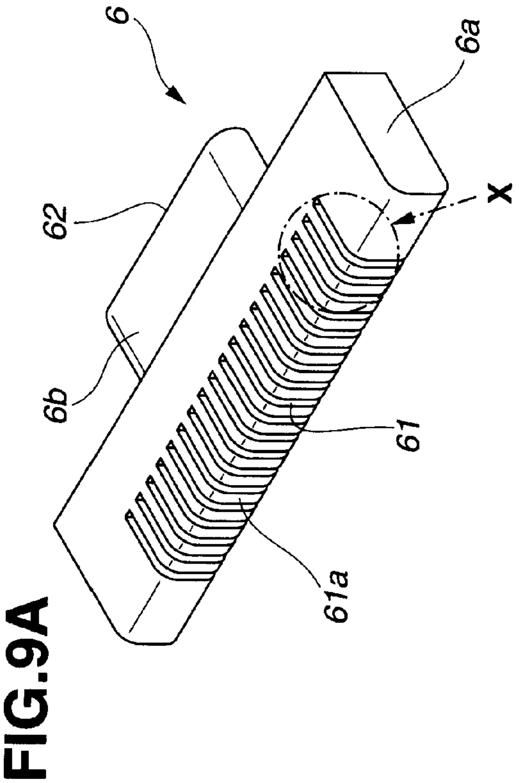
FIG. 9 illustrates one exemplary cutting fluid feed nozzle, FIG. 9A being a perspective view, FIG. 9B being a plan view, FIG. 9C being a front view, and FIG. 9D being an enlarged view of circle X in FIG. 9A.
Figure 9B:
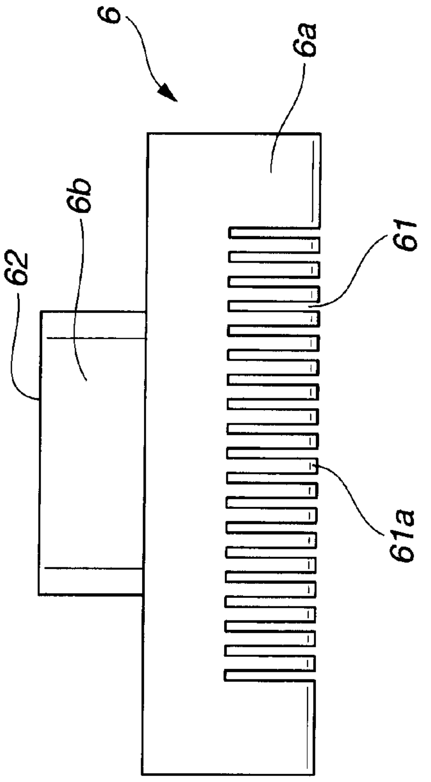
Figure 9C:
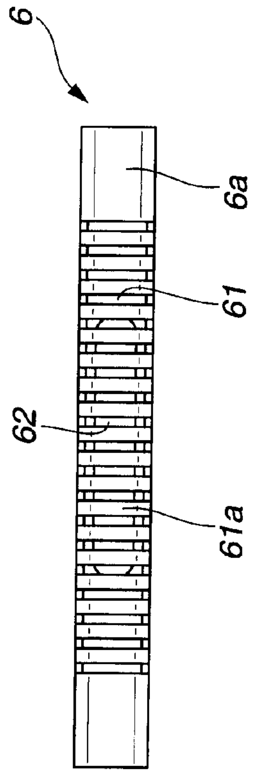
Figure 9D:
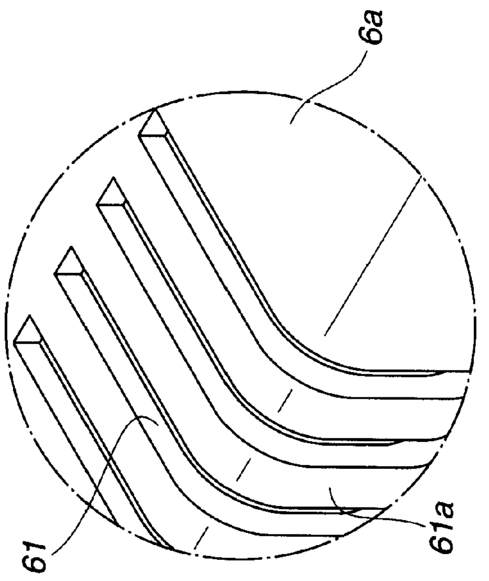

The magnet block which can be held by the jig of the invention is not limited to the rectangular parallelepiped one illustrated in the foregoing embodiments. The magnet block may be of a generally half-tubular shape (arch in cross section) having curved surfaces as shown in FIG. 8, or cylindrical or semi-cylindrical shape, or polygonal prism shape such as triangular prism. Also, as shown in FIG. 8, a portion of each holder hook which comes in contact with a workpiece may be configured to match with the surface shape of the workpiece.

Particularly when the upper surface of a magnet block to be cut is a curved or slant surface rather than a horizontal surface as in the embodiment of a generally half-tubular magnet block shown in FIG. 8, for example, the first and second holders are configured such that the hooks of the first and second holders are in contact with the upper surface of the workpiece. This leads to a secure holding.

It is understood that in FIGS. 6 to 8, components of the jig other than those components described above are the same as in FIG. 3, and their description is omitted herein.

In the prior art, when a rare earth magnet block is machined into multiple magnet pieces by a multiple blade assembly, the magnet block is generally held to a carbon-based support by bonding with wax or a similar adhesive which can be removed after cutting. In contrast, using a jig adapted to hold a magnet block by clamping it between holders, the invention obviates the bonding, stripping and cleaning steps of the prior art process and saves the laborious operation. When a magnet block is held by the jig, the jig prevents the magnet block from moving sideways during the cutting operation, achieving precise cutoff machining.

The magnet holding jig is best suited to hold a magnet block when it is cut by a magnet cutoff machine.

When a rare earth magnet block is machined into multiple magnet pieces, a multiple blade assembly is used in combination with the jig. First the magnet block is held in place by the jig. The multiple blade assembly is set such that cutoff abrasive blades are inserted into guide paths. The cutoff abrasive blades are then brought in contact with the magnet block. The blade assembly and the magnet block (or the jig) are moved relatively whereby the magnet block is cut into pieces.

Multiple Blade Assembly

The jig of the invention is advantageously used to hold a rare earth magnet block when the magnet block is subjected to multiple cutoff machining using a multiple blade assembly. A typical multiple blade assembly comprises a plurality of cutoff abrasive blades mounted on a rotating shaft at axially spaced apart positions, each said blade comprising a core in the form of a thin disk or thin doughnut disk and a peripheral cutting part on an outer peripheral rim of the core. While the cutoff abrasive blades are rotated, the multiple blade assembly is moved relative to the magnet block, achieving multiple cutoff machining.

Figure 1A:
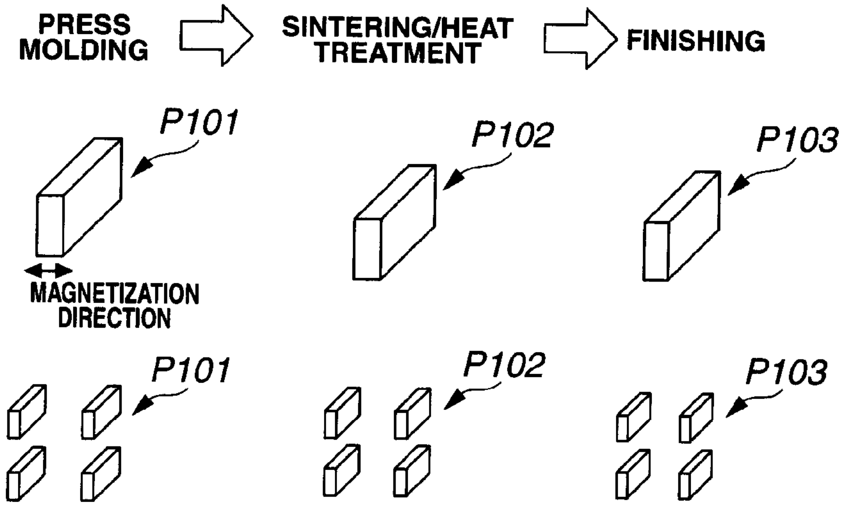
FIG. 1 schematically illustrates rare earth magnet piece manufacturing processes including press molding, sintering/heat treating and finishing steps, showing how the shape of parts changes in the successive steps.
Figure 1B:
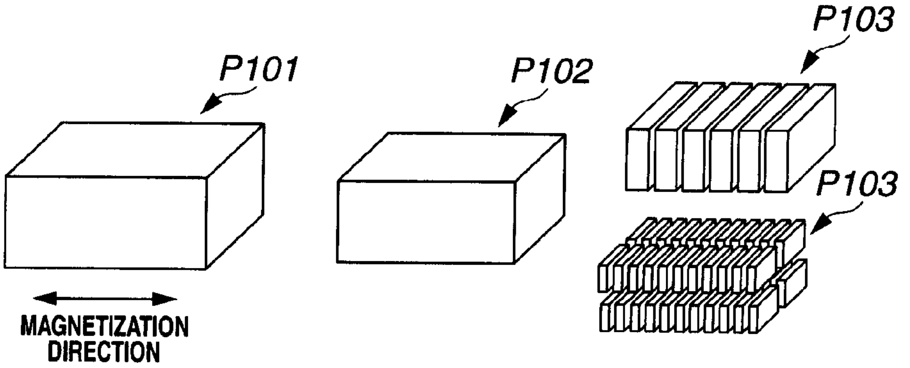
Figure 2:
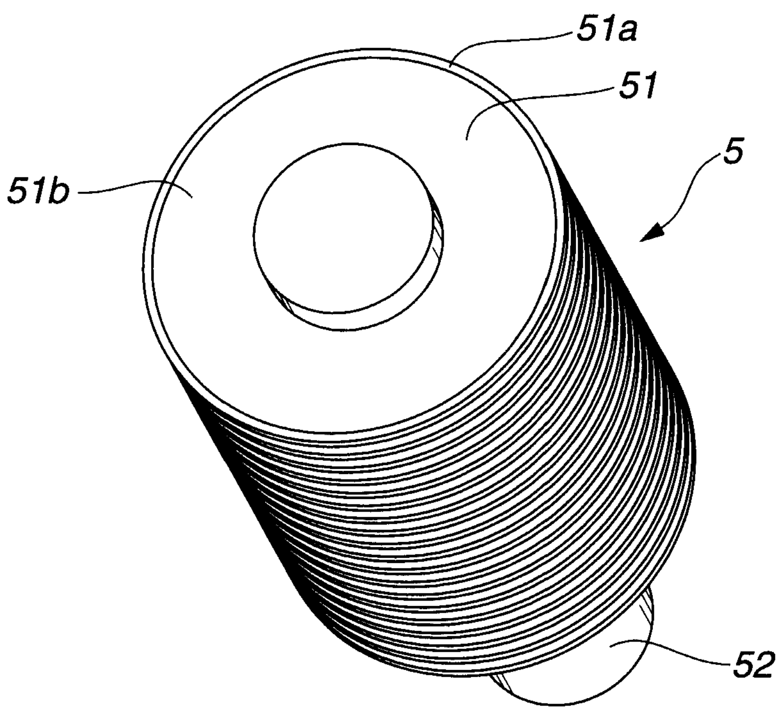
FIG. 2 is a perspective view illustrating one exemplary multiple blade assembly.

Any prior art well-known multiple blade assembly may be used in the multiple cutoff machining process. As shown in FIG. 2, one exemplary multiple blade assembly 5 includes a rotating shaft 52 and a plurality of cutoff abrasive blades or OD blades 51 coaxially mounted on the shaft 52 alternately with spacers (not shown), i.e., at axially spaced apart positions. Notably, the number of cutoff abrasive blades is 19 in the embodiment of FIG. 2 and generally in a range of 2 to 100, but not limited thereto. Each blade 51 includes a core **51*b* in the form of a thin disk or thin doughnut disk and a peripheral cutting part or abrasive grain-bonded section 51*a* on an outer peripheral rim of the core 51*b*. The number of cutoff abrasive blades 51 is generally equal to the number of guide paths in the jig (for example, 39 in the case of the jig shown in FIGS. 3 and 4** as having 39 guide paths.

The dimensions of the core are not particularly limited. Preferably the core has an outer diameter of 80 to 200 mm, more preferably 100 to 180 mm, and a thickness of 0.1 to 1.0 mm, more preferably 0.2 to 0.8 mm. The core in the form of a thin doughnut disk has a bore having a diameter of preferably 30 to 80 mm, more preferably 40 to 70 mm.

The peripheral cutting part or abrasive grain-bonded section has a width W in the thickness or axial direction of the core, which is from (T+0.01) mm to (T+4) mm, more preferably (T+0.02) mm to (T+2) mm, provided that the core has a thickness T. An outer portion of the peripheral cutting part or abrasive grain-bonded section that projects radially outward from the outer peripheral rim of the core has a projection distance which is preferably 0.1 to 10 mm, more preferably 0.3 to 8 mm, depending on the size of abrasive grains to be bonded. An inner portion of the peripheral cutting part or abrasive grain-bonded section that radially extends on the core has a coverage distance which is preferably 0.1 to 10 mm, more preferably 0.3 to 8 mm.

The spacing between cutoff abrasive blades may be suitably selected depending on the thickness of magnet pieces after cutting, and preferably set to a distance which is slightly greater than the thickness of magnet pieces, for example, by 0.01 to 0.4 mm.

For machining operation, the cutoff abrasive blades are preferably rotated at 1,000 to 15,000 rpm, more preferably 3,000 to 10,000 rpm.

When a rare earth magnet block is machined into multiple magnet pieces, a multiple blade assembly is used in combination with the jig. First the magnet block is held in place by the jig. The multiple blade assembly is set such that peripheral cutting parts of cutoff abrasive blades are inserted into guide paths. While a cutting fluid is fed, the multiple bladed assembly is operated such that the peripheral cutting parts of rotating cutoff abrasive blades come in contact with the magnet block. The blade assembly and the magnet block (or the jig) are moved relatively in a transverse direction of the magnet block (which may be a width or longitudinal direction of the block) whereby the magnet block is cut into pieces.

More specifically, after a rare earth magnet block is held in place by the jig, either one or both of the multiple blade assembly and the jig are relatively moved in the transverse direction of the magnet block. While the multiple blade assembly is rotated, the magnet block is cut by the outer peripheral parts of cutoff abrasive blades. The multiple blade assembly is further moved to a position out of contact with the magnet block, shifted perpendicular to the transverse direction, and then moved relative to the jig to carry out cutoff machining in the transverse direction. This machining operation may be repeated one or more times.

Around the cutoff abrasive blades which rotate at a high velocity, air streams are produced. The air streams form so as to surround the peripheral cutting parts of the cutoff abrasive blades. Thus if cutting fluid is directly injected toward the peripheral cutting parts of the cutoff abrasive blades, the cutting fluid impinges with the air streams and is scattered away thereby. That is, the air layer obstructs the contact of cutting fluid with the cutting parts and hence an efficient supply of cutting fluid. In contrast, in the setting that the outer peripheral portions of the cutoff abrasive blades are inserted into the guide paths in the jig, the air streams are blocked by the jig body (slit-defining digits) so that the cutting fluid may contact with the outer peripheral portions of the cutoff abrasive blades without obstruction by the air layer.

Accordingly, the cutting fluid that has contacted with the outer peripheral portions of the cutoff abrasive blades is entrained by the surfaces (outer peripheral surface and radially outer portions of side surfaces) of the cutoff abrasive blades being rotated and, under the centrifugal force due to rotation of the cutoff abrasive blades, transported toward the peripheral cutting parts of the cutoff abrasive blades. The cutting fluid that has reached the peripheral cutting parts is transported to points of cutoff machining on the magnet block as the cutoff abrasive blades rotate. This ensures that the cutting fluid is efficiently delivered to the points of cutoff machining. This, in turn, permits to reduce the amount of cutting fluid fed. Additionally, the areas of machining can be effectively cooled.

Fluid Feed Nozzle

During multiple cutoff machining of a rare earth magnet block, a cutting fluid is typically fed to the cutoff abrasive blades to facilitate machining. To this end, one preferred embodiment of the invention uses a cutting fluid feed nozzle having a cutting fluid inlet at one end and a plurality of slits formed at another end and corresponding to the plurality of cutoff abrasive blades such that an outer peripheral portion of each cutoff abrasive blade may be inserted in the corresponding slit.

Figures 10A, 10B, 10C, 10D:
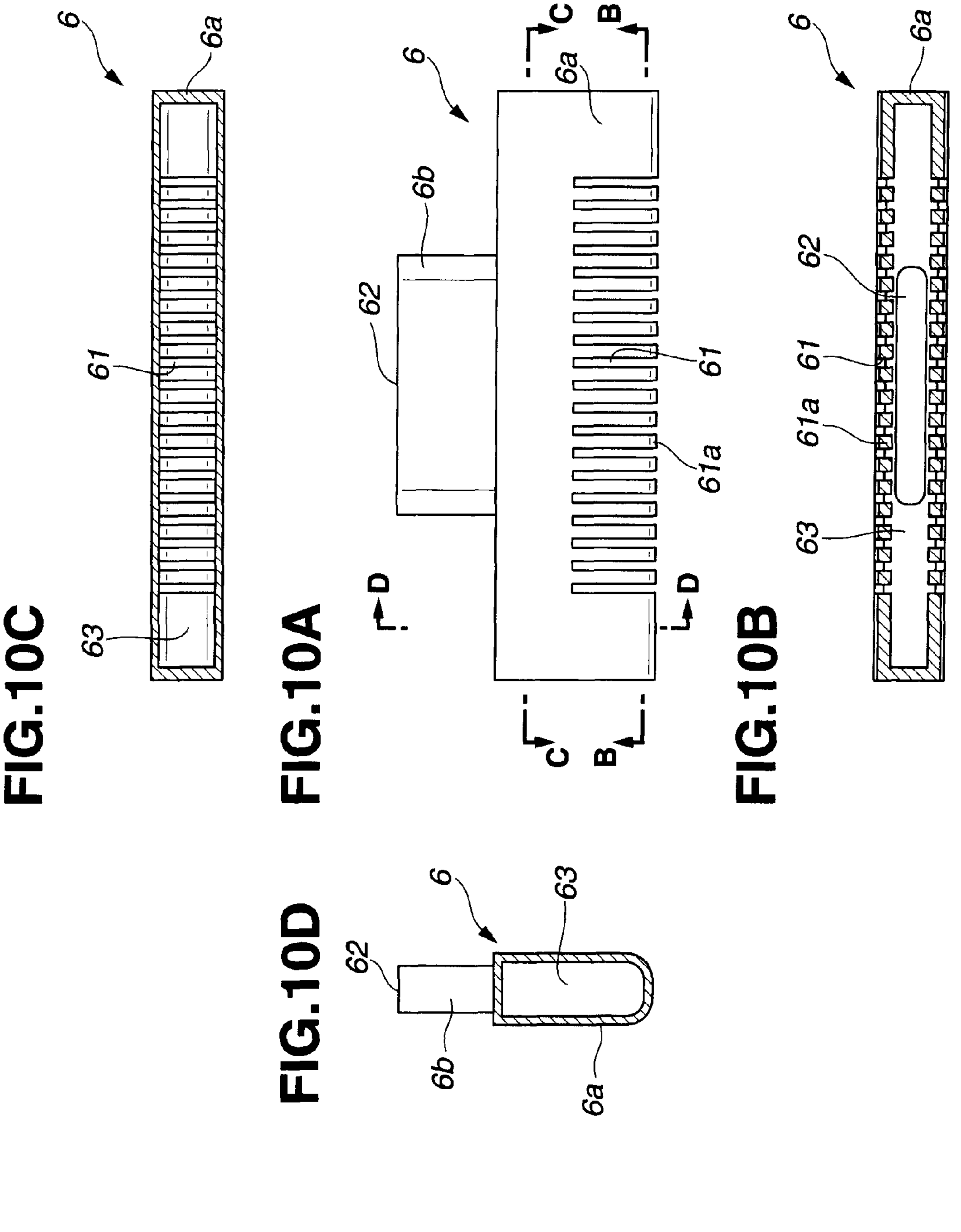
FIG. 10 illustrates another exemplary cutting fluid feed nozzle, FIG. 10A being a plan view, FIGS. 10B, 10C and 10D being cross-sectional views taken along lines B-B, C-C, and D-D in FIG. 10A, respectively.

As shown in FIGS. 9 and 10, the cutting fluid feed nozzle 6 includes a hollow nozzle housing 6*a* and a lateral conduit 6*b*. The conduit 6*b* has one end which is open to define an inlet 62 for cutting fluid and another end attached to one side of the hollow nozzle housing 6*a* to provide fluid communication with the hollow interior or fluid distributing reservoir 63 of the housing 6*a*. A portion of the hollow nozzle housing 6*a* which is opposed to the one side (or conduit 6*b*) is provided with a plurality of slits 61. The number of slits corresponds to the number of cutoff abrasive blades and is typically equal to the number of cutoff abrasive blades in the multiple blade assembly. The number of slits is not particularly limited although the number of slits generally ranges from 2 to 100. For the purpose of controlling the amount of cutting fluid injected through the slits, the number of slits may be greater than the number of blades so that during operation of the nozzle when the blades are inserted in slits, some outside slits are left open.

The feed nozzle 6 is combined with the multiple blade assembly 5 such that an outer peripheral portion of each cutoff abrasive blade 51 may be inserted into the corresponding slit 61 in the feed nozzle 6. Then the slits 61 are arranged at a spacing which corresponds to the spacing between cutoff abrasive blades 51, and the slits 61 extend straight and parallel to each other.

The outer peripheral portion of each cutoff abrasive blade which is inserted into the corresponding slit in the feed nozzle functions such that the cutting fluid coming in contact with the cutoff abrasive blades is entrained on the surfaces (outer peripheral portions) of the cutoff abrasive blades and transported to points of cutoff machining on the magnet block. Then the slit has a width which must be greater than the width of the cutoff abrasive blade (i.e., the width W of the outer cutting part). Through slits having too large a width, the cutting fluid may not be effectively fed to the cutoff abrasive blades and a more fraction of cutting fluid may drain away from the slits. Provided that the peripheral cutting part of the cutoff abrasive blade has a width W (mm), the slit in the feed nozzle preferably has a width of from more than W mm to (W+6) mm, more preferably from (W+0.1) mm to (W+6) mm.

The slit portion 61*a* of the feed nozzle 6 is defined by a wall having a certain thickness. A thin wall has a low strength so that the slits may be readily deformed by contact with the blades or the like, failing in a stable supply of cutting fluid. If the wall is too thick, the nozzle interior may become too narrow to define a flowpath and the outer peripheral portion of the cutoff abrasive blade which is inserted into the slit may not come in full contact with the cutting fluid within the feed nozzle. Then the slit portion 61*a* of the feed nozzle 6 has a wall thickness which varies depending on the material of which it is made, and preferably is 0.5 to 10 mm when the wall is made of plastics, and 0.1 to 5 mm when the wall is made of metal materials.

The slit has such a length that when the outer peripheral portion of the cutoff abrasive blade is inserted into the slit, the outer peripheral portion may come in full contact with the cutting fluid within the feed nozzle. Often, the slit length is preferably about 2% to 30% of the outer diameter of the core of the cutoff abrasive blade. It is also preferred that when the outer peripheral portion of the cutoff abrasive blade is inserted into the slit, the slit be substantially blocked with the blade, but without contact with the blade. For the purpose of injecting part of the cutting fluid directly to the cutoff abrasive blade, the magnet block being machined, and the magnet holding jig, the slit may have such a length that when the outer peripheral portion of the cutoff abrasive blade is inserted into the slit, a proximal portion of the slit is left unblocked.

Figure 11:
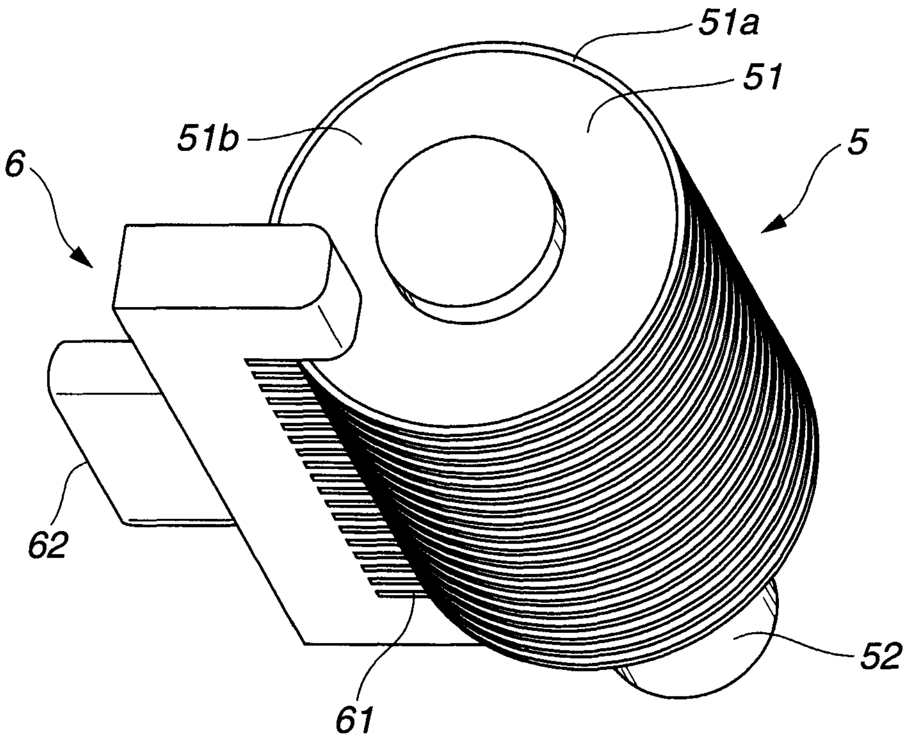
FIG. 11 is a perspective view showing a combination of the multiple blade assembly of FIG. 2 with the cutting fluid feed nozzle of FIG. 9 or 10, with cutoff abrasive blades being inserted into slits in the feed nozzle.
Figure 12:
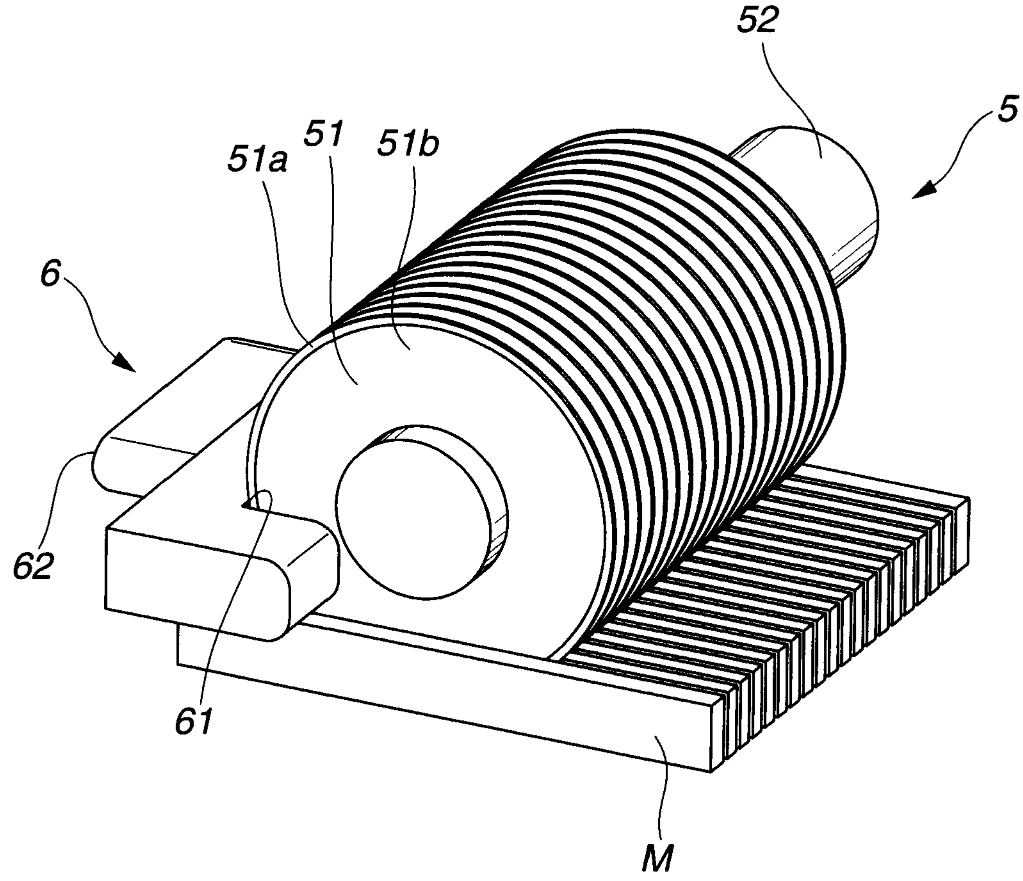
FIG. 12 is a perspective view illustrating that the rare earth magnet block is cutoff machined using the combination of multiple blade assembly with cutting fluid feed nozzle.

The feed nozzle 6 is combined with the multiple blade assembly 5 as shown in FIGS. 11 and 12 such that the outer peripheral portion of the cutoff abrasive blade 51 is inserted into the slit 61 in the feed nozzle 6. In this state, cutting fluid is introduced into the feed nozzle 6 through the inlet 62 and injected through the slits 61, and the cutoff abrasive blades 51 are rotated. Then the magnet block M is cut off by the peripheral cutting parts 51*a* of the blades 51. The feed nozzle may be opposed to the magnet block with the cutoff abrasive blades interposed therebetween. Alternatively, the feed nozzle may be disposed above the magnet block such that the cutoff abrasive blades may pass through the slits in the feed nozzle vertically downward or upward. It is noted that the construction of the multiple blade assembly 5 in FIGS. 11 and 12 is the same as in FIG. 2, with like reference characters designating like parts.

In the setting that the multiple blade assembly, feed nozzle and magnet block are disposed as described above, while the cutoff abrasive blades are rotated, either one or both of the multiple blade assembly combined with the feed nozzle and the magnet block are relatively moved (in the width or longitudinal direction of magnet block) with the cutting parts kept in contact with the magnet block, whereby the magnet block is machined. When the magnet block is machined in this way, a high accuracy of cutoff machining is possible since the slits serve to restrict any axial runout of the cutoff abrasive blades being rotated.

In the setting that the outer peripheral portions of cutoff abrasive blades are inserted into slits of the cutting fluid feed nozzle, when it is intended to bring the peripheral portions in contact with the cutting fluid in the interior of the nozzle, the air streams are blocked by the feed nozzle housing (slit-defining portion) so that the cutting fluid may contact with the peripheral portions of the cutoff abrasive blades without obstruction by the air layer. When both the cutting fluid feed nozzle and the magnet holding jig are used, their cooperation ensures to deliver the cutting fluid to points of cutoff machining.

Where the cutting fluid feed nozzle is used, the feed nozzle and the jig are preferably combined to provide fluid communication between the slits in the feed nozzle and the guide paths in the jig. With respect to the distance between the slits in the feed nozzle and the guide paths in the jig, a relatively short distance is advantageous for the delivery of the cutting fluid by entrainment on the surfaces of cutoff abrasive blades. However, a too close distance may become an obstruction against the movement of the multiple blade assembly and magnet block, the injection and draining of the cutting fluid, or the like. Then the preferred distance between the slits in the feed nozzle and the guide paths in the jig is 1 mm to 50 mm, as measured between the feed nozzle and the top of the jig or the top of the magnet block at the end of cutting operation (for example, the feed nozzle is positioned 1 to 50 mm above the top of the jig at the end of cutting operation).

The workpiece which is intended herein to cutoff machine is a rare earth magnet block, typically a sintered one. Although the rare earth magnet as the workpiece is not particularly limited, suitable rare earth magnets include sintered rare earth magnets of R—Fe—B systems wherein R is at least one rare earth element inclusive of yttrium.

Suitable sintered rare earth magnets of R—Fe—B system are those magnets containing, in weight percent, 5 to 40% of R, 50 to 90% of Fe, and 0.2 to 8% of B, and optionally one or more additive elements selected from C, Al, Si, Ti, V, Cr, Mn, Co, Ni, Cu, Zn, Ga, Zr, Nb, Mo, Ag, Sn, Hf, Ta, and W, for the purpose of improving magnetic properties and corrosion resistance. The amounts of additive elements added are conventional, for example, up to 30 wt % of Co, and up to 8 wt % of the other elements. The additive elements, if added in extra amounts, rather adversely affect magnetic properties.

Suitable sintered rare earth magnets of R—Fe—B system may be prepared, for example, by weighing source metal materials, melting, casting into an alloy ingot, finely dividing the alloy into particles with an average particle size of 1 to 20 μm, i.e., sintered R—Fe—B magnet powder, compacting the powder in a magnetic field, sintering the compact at 1,000 to 1,200° C. for 0.5 to 5 hours, and heat treating at 400 to 1,000° C.

The dimensions of a rare earth magnet block, workpiece are not particularly limited. Appropriate blocks have a width (in a transverse or cutting direction) of 10 to 100 mm, a length (perpendicular to the cutting direction) of 10 to 100 mm, and a thickness of 5 to 50 mm.

EXAMPLE

Examples and Comparative Examples are given below for further illustrating the invention although the invention is not limited thereto.

Example 1

OD blades (cutoff abrasive blades) were fabricated by providing a doughnut-shaped disk core of cemented carbide (composed of WC 90 wt %/Co 10 wt %) having an outer diameter 120 mm, inner diameter 40 mm, and thickness 0.35 mm, and bonding, by the resin bonding technique, diamond abrasive grains to an outer peripheral rim of the core to form an abrasive section (peripheral cutting part) containing 25% by volume of diamond grains with an average particle size of 150 μm. The axial extension of the abrasive section from the core was 0.05 mm on each side, that is, the abrasive portion had a width (in the thickness direction of the core) of 0.45 mm.

Using the OD blades, a cutting test was carried out on a workpiece which was a sintered Nd—Fe—B magnet block. The test conditions are as follows. A multiple blade assembly was manufactured by coaxially mounting 39 OD blades on a shaft at an axial spacing of 2.1 mm, with spacers interposed therebetween. The spacers each had an outer diameter 80 mm, inner diameter 40 mm, and thickness 2.1 mm. The multiple blade assembly was designed so that the magnet block was cut into magnet pieces having a thickness of 2.0 mm.

The workpiece was a sintered Nd—Fe—B magnet block having a length 100 mm, width 30 mm and height 17 mm, which was polished at an accuracy of ±0.05 mm by a vertical double-disk polishing tool. By the multiple blade assembly, the magnet block is transversely cut into a plurality of magnet pieces of 2.0 mm thick. Specifically, one magnet block is cut into 38 magnet pieces because two outermost pieces are excluded.

Figure 13A:
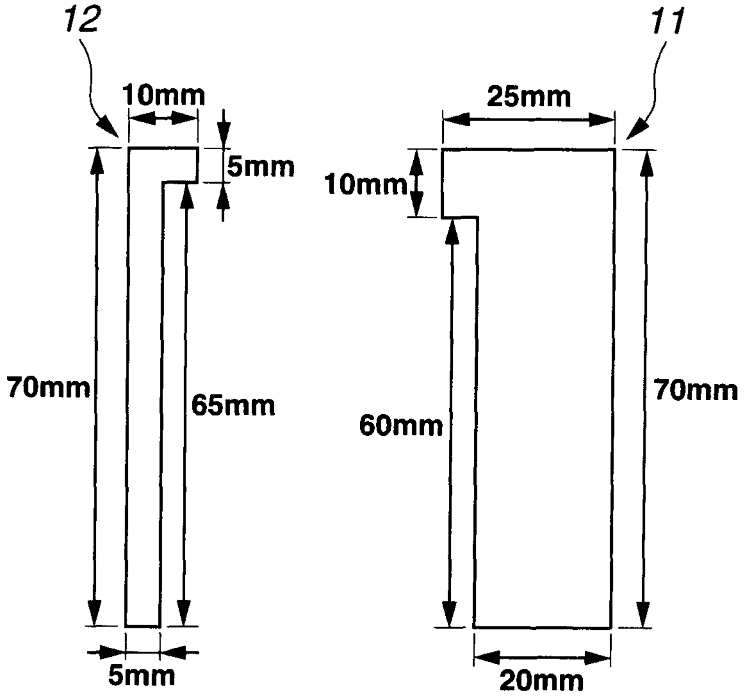
FIG. 13 is a view showing dimensions of holders of the jig used in Examples and Comparative Examples.

The workpiece, sintered Nd—Fe—B magnet block was held in place by the jig shown in FIG. 3. The dimensions of components of the first and second holders are shown in FIG. 13A. The holders were formed of an aluminum alloy having a Young's modulus of $7.30\times10^4$ MPa and a proof stress of $4.12\times10^2$ MPa. The holders were configured such that the hook of the second holder was more susceptible to elastic deformation than the hook of the first holder.

The first and second holders were pushed inward. While the first holder was fixedly secured to rails by bolts, a pneumatic cylinder was actuated to push the second holder inward. As a result, the magnet block was pressed from the opposite sides of the jig. The pressure of the pneumatic cylinder was increased so that the hooks of the first and second holders were deformed to a total deformation amount of 0.05 mm, thereby holding the magnet block in place.

For cutoff machining operation, a cutting fluid was fed at a flow rate of 30 L/min. First, the multiple blade assembly was positioned above the second holder and descended toward the magnet block until the peripheral cutting parts of cutoff abrasive blades were inserted into the corresponding guide paths by a distance of 2 mm from the blade periphery. While feeding the cutting fluid from the feed nozzle and rotating the cutoff abrasive blades at 7,000 rpm, the multiple blade assembly was moved at a speed of 100 mm/min toward the first holder for cutoff machining the magnet block in a transverse direction. At the end of this stroke, the assembly was moved back to the second holder side without changing its height. In this way, cutoff channels of 2 mm deep were formed in the magnet block.

Next, the multiple blade assembly above the second holder was descended toward the magnet block by a distance of 16 mm. While feeding the cutting fluid from the feed nozzle and rotating the cutoff abrasive blades at 7,000 rpm, the multiple blade assembly was moved at a speed of 20 mm/min toward the first holder for cutoff machining the magnet block in the transverse direction. At the end of this stroke, the assembly was moved back to the second holder side without changing its height, completing the cutoff machining of the magnet block into the predetermined number of magnet pieces. The magnet pieces were measured for thickness at 5 points (i.e., center and four corners of rectangular cut section). A difference between the maximum and minimum thicknesses was computed and reported as a size variation, with the results shown in Table 1.

Example 2

Figure 13B:
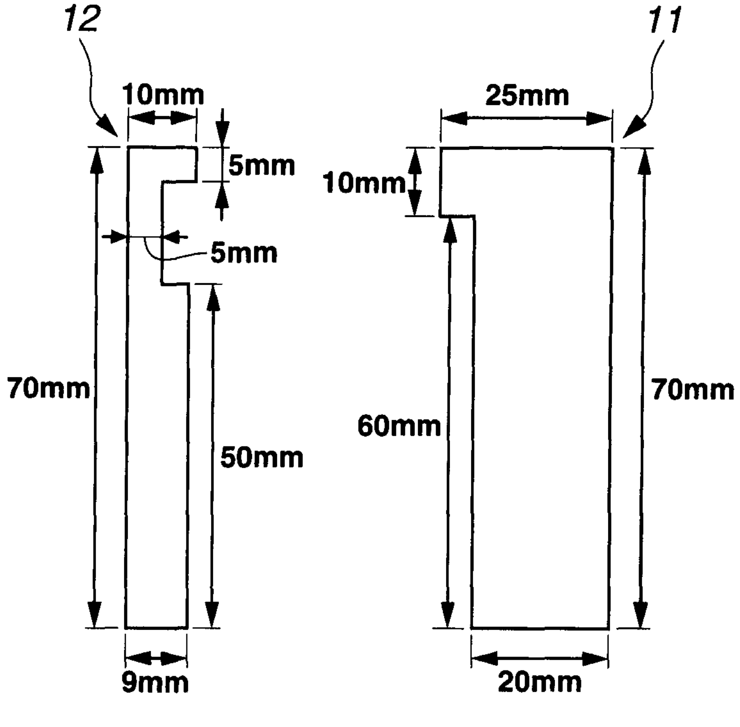

A magnet block was cut into pieces by the same procedure as in Example 1 aside from using the jig of FIG. 6 to hold the magnet block in place. A size variation was similarly evaluated. The results are also shown in Table 1. The dimensions of components of the first and second holders are shown in FIG. 13B.

Example 3

Magnet blocks were cut into pieces by the same procedure as in Example 1 aside from using the multiple jig arrangement of FIG. 7 to hold the magnet blocks in place. A size variation was similarly evaluated. The results are also shown in Table 1. The individual jigs constituting the multiple jig arrangement were the same as in Example 1 and the spacers had a thickness of 0.1 mm.

Comparative Example 1

According to the prior art method, a magnet block was secured to a carbon plate by bonding with wax. The magnet block was then cut into pieces by the same procedure as in Example 1. A size variation was similarly evaluated. The results are also shown in Table 1.

Comparative Example 2

A magnet block was cut into pieces by the same procedure as in Example 1 except that the first and second holders were formed of stainless steel SUS304 having a Young's modulus of $1.93\times10^5$ MPa. A size variation was similarly evaluated. The results are also shown in Table 1. Even when the pressure of the pneumatic cylinder was increased, a total deformation amount of the hooks of the first and second holders did not reach 0.01 mm. A test of placing a pressure-sensitive paper sheet between the hook digits and the magnet block confirmed that some digits of the digitate hook were not in pressure abutment with the magnet block. At the end of cutting operation, some magnet pieces were loosened from the jig. Such loose magnet pieces contacted with the rotating cutoff abrasive blades and were in part abraded and chipped away.

TABLE 1

| | Example | | | Comparative Example | |
|---|---|---|---|---|---|
| | 1 | 2 | 3 | 1 | 2 |
| Young's modulus (MPa) | $7.30 \times 10^4$ | $7.30 \times 10^4$ | $7.30 \times 10^4$ | — | $1.93 \times 10^5$ |
| Size variation (μm) | 36 | 34 | 32 | 42 | 175 |
| Hook deformation amount (mm) | 0.05 | 0.1 | 0.1 | — | <0.01 |

Japanese Patent Application No. 2010-001054 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A jig for holding a rare earth magnet block in place when the block is cut in a transverse direction by a cutting machine having multiple cutting blades, comprising a platform on which the magnet block is rested, the platform having opposed sides in the transverse direction, a first holder disposed on one side of the platform and constructed integral with or separate from the platform, and a second holder disposed on the other side of the platform and constructed separate from the platform, wherein at least a top portion of the platform is provided with channels, at least upper portions of the first and second holders are comb-shaped to define digits and slits, the channels and the slits are aligned to together define guide paths for permitting entry of the cutting blades therein, the upper portions of the first and second holders are also configured as digitate hooks each having an inward projecting tip, the platform, the first and second holders are assembled such that the hook tips of the first and second holders are in contact with an upper portion of the magnet block resting on the platform, said jig further comprising pusher means for pushing inward the first and second holders at their lower portions so as to elastically deform the digitate hook of at least one of the first and second holders and move it backward and to bring the hook digits in pressure abutment with the magnet block, whereby the restoring force due to the stress of elastic deformation causes the hook digits to forcedly press the magnet block for thereby holding the magnet block in place on the platform.

2. The jig of claim 1 wherein one or both of the first 35 and second holders are formed of a material having a Young's modulus of $5\times10^3$ MPa to $1\times10^5$ MPa.

3. The jig of claim 1 wherein one or both of the first and second holders are formed of a material having a Young's modulus of $5\times10^3$ MPa to $1\times10^5$ MPa and a yield strength of at least $2\times10^2$ MPa.

4. The jig of claim 1 wherein at least one of the first and second holders has stop means for restricting the backward movement of the hook when the hook is elastically deformed and moved backward, so that the stress of elastic deformation may not exceed the yield strength of the material of which the holders are formed.

5. The jig of claim 4 wherein the stop means comprises a stop disposed in the holder below the hook, the stop is spaced apart from the magnet block when the hook tip is in contact with the magnet block prior to the elastic deformation of the hook, but comes in abutment with the magnet block when the hook is elastically deformed and moved backward by a predetermined amount, for thereby restricting further backward movement of the hook.

6. The jig of claim 5 wherein the stop is configured to (1) a shape which is less susceptible to elastic deformation than the hook, (2) a size which is less susceptible to elastic deformation than the hook, or (3) a shape and size which is less susceptible to elastic deformation than the hook.

7. A multiple jig arrangement comprising a plurality of jigs as set forth in claim 1, arranged in tandem in the transverse direction, wherein the backsides of the hooks of two adjacent jigs come in abutment with each other when the hook is elastically deformed and moved backward by a predetermined amount, for thereby restricting the backward movement of the hook so that the stress of elastic deformation may not exceed the yield strength of the material of which the holders are formed.

8. The multiple jig arrangement of claim 7 wherein a plurality of jigs are arranged in tandem such that the first holders and the second holders are alternately arranged.

9. The jig of claim 1 wherein the hook of one of the first and second holders is configured to (1) a shape that allows for more backward movement by elastic deformation than the hook of the other holder, (2) a size that allows for more backward movement by elastic deformation than the hook of the other holder, or (3) a shape and size that allows for more backward movement by elastic deformation than the hook of the other holder.

10. A machine for cutting a rare earth magnet block comprising the jig of claim 1.

11. The cutting machine of claim 10, further comprising a multiple blade assembly comprising a plurality of cutoff abrasive blades coaxially mounted on a rotating shaft at axially spaced apart positions, each said blade comprising a core in the form of a thin disk or thin doughnut disk and a peripheral cutting part on an outer peripheral rim of the core.

* * * * *